(12) United States Patent
Wu et al.

(10) Patent No.: US 11,409,123 B1
(45) Date of Patent: Aug. 9, 2022

(54) ACTIVE SELF-MONITORING BINOCULAR CALIBRATION TARGET

(71) Applicant: MLOptic Corp, Redmond, WA (US)

(72) Inventors: Pengfei Wu, Nanjing (CN); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/683,347

(22) Filed: Feb. 28, 2022

(51) Int. Cl.
G02B 1/11 (2015.01)
G02B 27/62 (2006.01)
H04N 7/18 (2006.01)
G02B 27/10 (2006.01)

(52) U.S. Cl.
CPC ............... G02B 27/62 (2013.01); G02B 1/11 (2013.01); G02B 27/1006 (2013.01); H04N 7/181 (2013.01)

(58) Field of Classification Search
CPC ...... G02B 27/62; G02B 1/11; G02B 27/1006; H04N 7/181; G01B 9/02022; G01B 9/02067; G01B 11/2441
USPC ........................................................ 356/138
See application file for complete search history.

(56) References Cited

U.S. PATENT DOCUMENTS

| 3,652,167 | A | * | 3/1972 | Smith | G02B 21/0016 |
| | | | | | 359/638 |
| 3,733,132 | A | * | 5/1973 | Leighton | G01B 11/27 |
| | | | | | 356/138 |
| 3,785,714 | A | * | 1/1974 | Hock | G02B 21/0016 |
| | | | | | 359/489.08 |
| 3,865,483 | A | * | 2/1975 | Wojcik | G01B 11/26 |
| | | | | | 250/548 |
| 3,963,353 | A | * | 6/1976 | Hemstreet | G02B 27/141 |
| | | | | | 356/399 |
| 4,170,401 | A | * | 10/1979 | Yoder, Jr | G01B 11/26 |
| | | | | | 359/489.08 |
| H261 | H | * | 4/1987 | Task | 356/138 |
| 4,758,731 | A | * | 7/1988 | Schuster | G03F 9/70 |
| | | | | | 250/559.3 |
| 4,796,999 | A | * | 1/1989 | Schuster | G03F 9/7003 |
| | | | | | 356/394 |
| 5,818,588 | A | * | 10/1998 | Matsumoto | G01D 5/266 |
| | | | | | 356/487 |

* cited by examiner

Primary Examiner — Isiaka O Akanbi
(74) Attorney, Agent, or Firm — Tracy Jong Law Firm; Tracy P. Jong; Cheng Ning Jong

(57) ABSTRACT

A system for providing two spaced-apart parallel light beams wherein the space between the two spaced-apart parallel light beams is adjustable, the system including a first beam splitter configured for reflecting a light beam from a light source to create a first light beam; a second light reflecting device configured for reflecting a transmitted light beam from the light beam from the light source to create a second light beam; an optical flat including a first surface and second surface facing away from the first surface, the optical flat disposed in a manner with the first surface facing the first light beam and the second light beam, the first surface configured to reflect and transmit the first light beam and the second light beam; and a mirror.

7 Claims, 4 Drawing Sheets

ACTIVE SELF-MONITORING BINOCULAR CALIBRATION TARGET

BACKGROUND OF THE INVENTION

1. The Field of the Invention

The present invention relates to a calibration system for a pair of binoculars. More specifically, the present invention is directed to an active self-monitoring calibration system for a pair of binoculars.

2. Background Art

Product performance testing of a pair of binoculars, e.g., Augmented Reality/Virtual Reality (AR/VR) glasses requires the use of perfectly parallelly-disposed light beams received at the exit pupils of the glasses to simulate a pair of human eyes. A deviation or defect of any one of the light paths through the exit pupils of the glasses is sufficient to cause severe discomfort to a user of the glasses. The genesis of a deviation of a light path through an exit pupils of AR/VR glasses can be imperfections introduced during fabrication, shipping and/or use of the AR/VR glasses. During a quality control process, a calibration system may be used in conjunction with the glasses to calibrate the glasses by indicating a deviation and adjusting one or more light paths of the glasses to eliminate the deviation. However, for the calibration system to be effective, the calibration system itself is required to be precise and free from any defects even when the interpupillary distance (IPD) of the calibration system is adjustable in the range of about 60 mm-220 mm. One such requirement is for the light beams useful for indicating whether the light paths through the exit pupils of the glasses are disposed in parallel. Like the glasses themselves, the calibration system useful for the calibrating the glasses is equally likely to be subject to imperfections introduced during fabrication, shipping and/or use of the calibration system. The interpupillary distance (IPD) of a general adult is between about 60 mm and 75 mm and the image projection module of the glasses is arranged at the outer end close to the human ear and the distance between exit pupils is between about 110-135 mm. In some instances, the IPD of the calibration system needs to cover a width of about 60 mm-135 mm. In the AR/VR virtual reality display equipment performance detection process, a target source or calibration system with a large IPD and a wide object distance range is required. A collimator suitable for providing large-aperture beams and wide object distances is large and costly and requires a large space to accommodate it, i.e., a space unavailable in a compact calibration system. The distance between the exit pupils of a suitable calibration system needs to be about 60 mm-200 mm.

There exists a need for a system for providing a calibration system having two light beams and the IPD of the two light beams must be capable of adjustment such that the distance between the two light beams is adjustable to coincide with the IPD of the glasses at exit pupils. Further, at least one of the mechanisms must be capable of adjustment such that the two light beams can be disposed in a perfectly parallel configuration.

SUMMARY OF THE INVENTION

In accordance with the present invention, there is provided a system for providing two spaced-apart parallel light beams wherein the space between the two spaced-apart parallel light beams is adjustable, the system including:

(a) a first beam splitter configured for reflecting a light beam from a light source to create a first light beam;

(b) a second light reflecting device configured for reflecting a transmitted light beam from the light beam from the light source to create a second light beam;

(c) an optical flat including a first surface and a second surface facing away from the first surface, the optical flat disposed in a manner with the first surface facing the first light beam and the second light beam, the first surface configured to reflect and transmit the first light beam and the second light beam; and (d) a mirror, wherein the reflected first light beam is reflected by the first beam splitter and the mirror is to form a first control light beam and the reflected second light beam is reflected by the second beam splitter and the mirror to form a second control light beam, if the first control light beam and the second control light beam are determined to be coincidental, the first light beam is determined to be parallel to the second light beam, otherwise a request for correcting at least one of an orientation and a translation of the second beam splitter is indicated.

In one embodiment, the system further includes a first camera configured for receiving a first image resulting from the first control light beam and the second control light beam and a control device to which the first camera is functionally connected and if the first image is determined by the control device to be of non-coincidental cast images by the first control light beam and the second control light beam, a request for correcting at least one of an orientation and a translation of the second beam splitter is indicated. In one embodiment, the distance is about 60-220 mm. In one embodiment, the system further includes a second camera configured for receiving a second image resulting from directing the first light beam and the second light beam through exit pupils of a pair of binoculars to an entrance pupil of the pair of binoculars and a control device to which the second camera is functionally connected and if the second image is determined to be of non-coincidental cast images through the exit pupils of the pair of binoculars by the first light beam and the second light beam, a light path through a first of the exit pupils of the pair of binoculars is determined to be not parallel to a light path through a second of the exit pupils of the pair of binoculars. In one embodiment, the cast images are cast images of reticles. In one embodiment, the orientation or rotation correction is is performed with a rotation mechanism. In one embodiment, the translation correction is performed with a translation mechanism. In one embodiment, the first surface is a surface coated with a transmission-to-reflection ratio coating of about 50:50. In one embodiment, the second surface is a surface coated with an anti-reflective (AR) coating.

An object of the present invention is to provide a calibration target for exit pupils of glasses and binoculars disposed at a large interpupillary distance (IPD).

Another object of the present invention is to provide an adjustable calibration target for exit pupils of glasses or binoculars disposed at various large IPDs.

Another object of the present invention is to provide a self-monitoring calibration target for exit pupils of glasses or binoculars disposed at a large IPD.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST 2-active self-monitoring binocular calibration system
4-light source
6-beam splitter
8-light beam
10-optical flat
12-base
14-movement
16-translation mechanism
18-reflected light beam
20-transmitted light beam
22-camera
24-perpendicular distance between light beams
26-cast image
28-exit pupil
30-binoculars or binocular telescope
32-deviation
34-collimator
36-entrance pupil of binoculars
38-bottom surface of optical flat
40-top surface of optical flat
42-system adjustment control device
44-rotation to eliminate deviation
46-perpendicular distance between light beams
48-perpendicular distance between light beams
50-cast image
52-cast image
54-cast image
56-camera
58-display
60-beam splitter orientation prior to correction
62-beam splitter orientation after correction
64-mirror
66-first central axis
68-second central axis
70-reticle
72-gear
74-gear

PARTICULAR ADVANTAGES OF THE INVENTION

The present active self-monitoring binocular calibration target does not require costly light source, e.g., laser emitter, etc., and camera for displaying cast images of a laser light source. At the point of detection, the deviation would have been magnified $2^3$ or 8 times the deviation in parallelism experienced at the right light beam, therefore the signal-to-noise ratio (SNR) is magnified.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
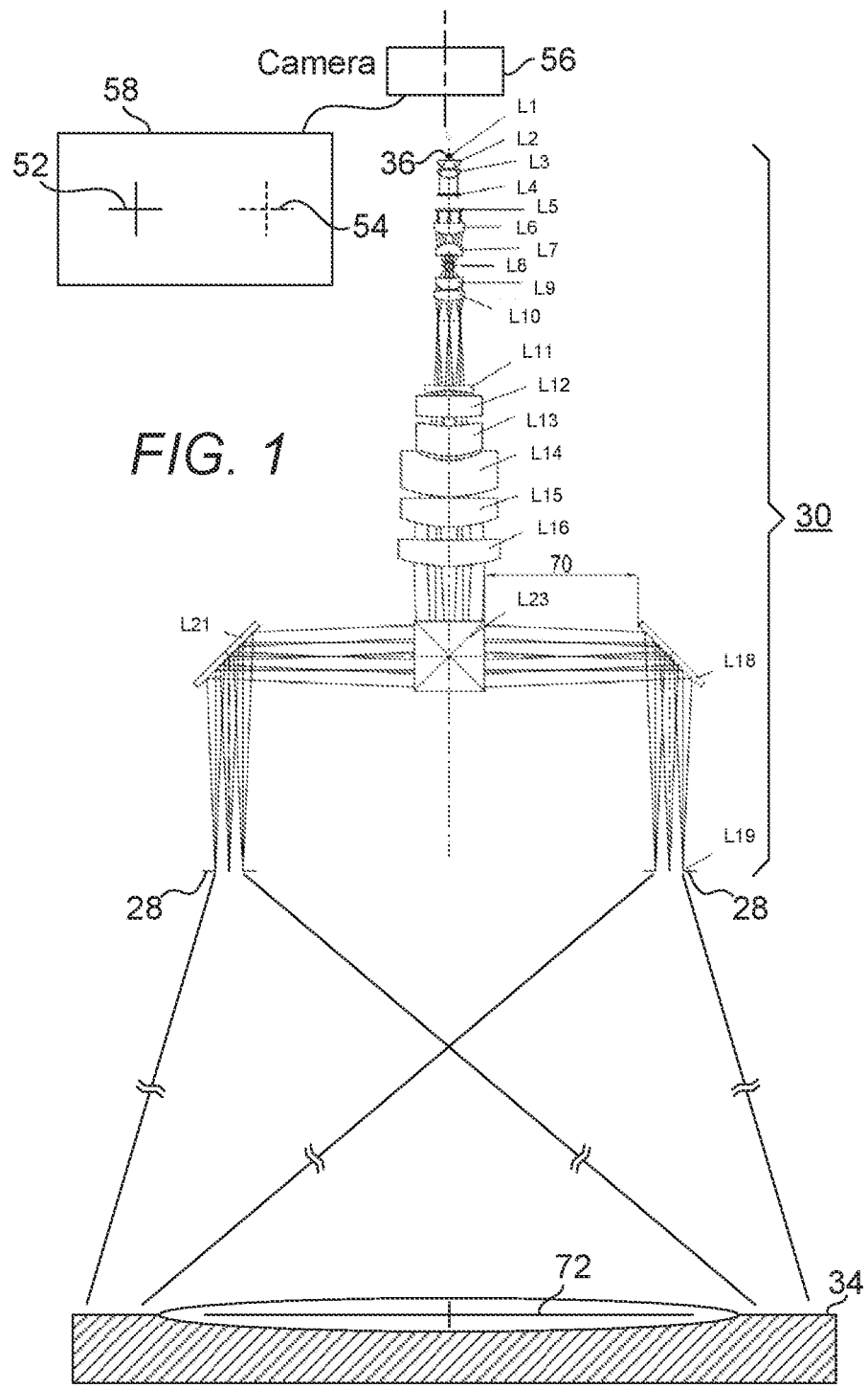
FIG. 1 is a diagram depicting one embodiment of a system for providing collimated light beams to be supplied to two spaced-apart exit pupils of a pair of binoculars for calibration.

FIG. 1 is a diagram depicting one embodiment of a system for providing collimated light beams to be supplied to two spaced-apart exit pupils 28 of a pair of binoculars or binocular telescope 30, e.g., a pair of augmented reality/virtual reality (AR/VR) binoculars for calibration. In calibrating the pair of binoculars 30, a large collimator 34 may be used to dispose the light beams entering the pair of binoculars through the exit pupils 28 in parallel configuration with the light paths of the binoculars 30. In this system, in order for the exit pupils 28 to allow images to traverse the light paths of the binoculars 30 and be cast at a camera 56 disposed at the entrance pupil end of the binoculars 30, the reticle 70 must be visible by the camera 56. A large interpupillary distance (IPD) necessarily requires the collimator 34 and the reticle 70 to be disposed at a large distance from the exit pupils 28 of the binoculars 30, making the entire setup of the collimator 34 large, costly and impractical due to weight and space limitations of the setup. In addition, if there are binoculars 30 of significantly different IPDs to be calibrated, multiple sets of collimators 34 and reticles 70 may be required, further adding to the costs and setup time. Display 58 of camera 56 shows images 52, 54 cast on and received by the camera 56. As shown, in order to calibrate the light paths of the binoculars 30, adjustments to the light paths must be made until the two cast images 52, 54 of the reticle 70 overlap one another. It is imperative that a calibration setup that is less costly, having more compact form factor and higher calibration throughputs be made available to enhance the optical calibration process of a pair of binoculars. FIGS. 2-6 depict various aspects of a present active self-monitoring calibration system for a pair of binoculars capable for use in calibrating binoculars having a large range of IPDs without requiring changeouts of any calibration setups.

Figure 2:
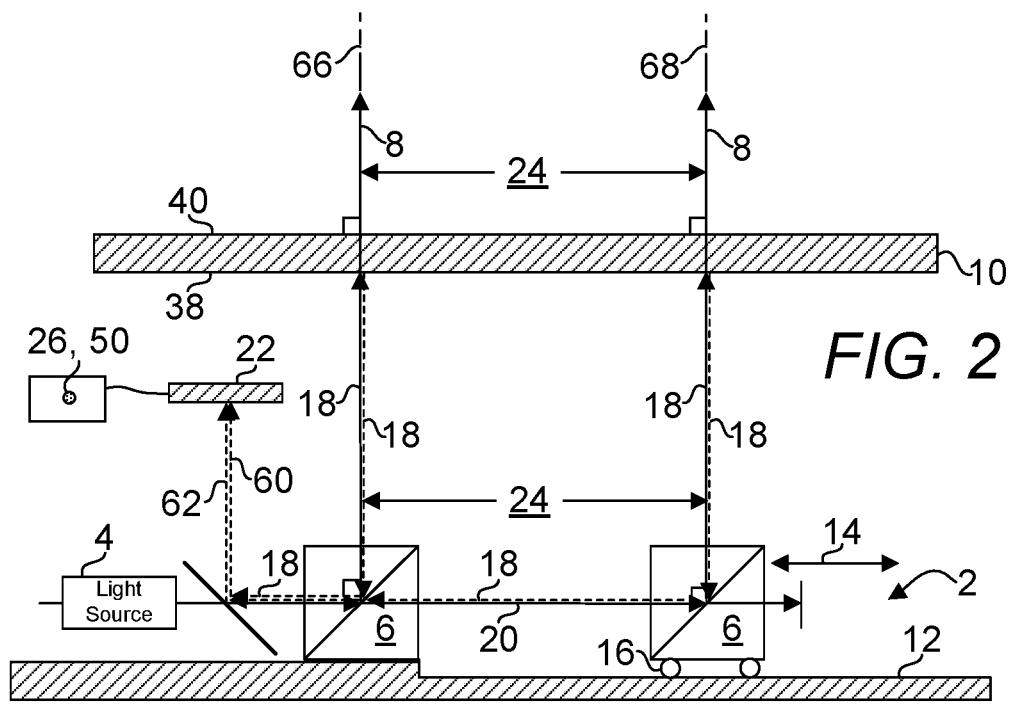
FIG. 2 is a diagram depicting one embodiment of a present system for providing highly-precise two spaced-apart parallel light beams, wherein the space between the two spaced-apart parallel light beams is configured to be actively adjustable.

FIG. 2 is a diagram depicting one embodiment of a present system 2 for providing highly-precise two spaced-apart parallel light beams 8, wherein the space 46 between the two spaced-apart parallel light beams 8 is configured to be actively adjustable. Note that the perpendicular distance between the two light beams 8 is consistent throughout. The system 2 includes a first beam splitter 6, a second beam splitter 6, an optical flat 10 and a mirror 64. The first beam splitter 6 is configured for reflecting a light beam from a light source 4 to create a first light beam 8. The second beam splitter 6 is configured for reflecting a transmitted light beam 20 from the light beam from the light source 4 to create a second light beam 8. The optical flat 10 includes a first surface 38 and second surface 40 facing away from the first surface 38. The optical flat 10 is disposed in a manner with the first surface 38 facing the first light beam 8 and the second light beam 8. The first surface 38 is configured to reflect and transmit the first light beam 8 and the second light beam 8. In one embodiment, the first surface 38 is a surface coated with a transmission-to-reflection ratio coating of about 50:50. In one embodiment, the second surface 40 is a surface coated with an anti-reflective (AR) coating that reduces or eliminates stray light and other artifacts potentially reflected back to the beam splitters 6 from the optical flat 10. It shall be noted that, for the first surface 38, it is necessary to transmit light beams to form the two light beams 8 and to reflect light beams that eventually result in cast images 26, 50. The first light beam reflected by the optical flat 10 is reflected by the first beam splitter 6 and the mirror 64 to form a first control light beam 60 and the reflected second light beam is reflected by the second beam splitter 6 and the mirror 64 to form a second control light beam 62, if the first control light beam 60 and the second control light beam 62 are determined to be coincidental, the first or left light beam 8 is determined to be parallel to the second or right light beam 8. A perpendicular distance 24 between the central axis 66 of the first beam splitter 6 and the central axis 68 of the second beam splitter 6 is adjustable to match two exit pupils 28 of a pair of binoculars that is to be calibrated. Therefore, in order to cast parallel light beams 8 through the light paths of the pair of binoculars 30, the perpendicular distance between the light paths must match the interpupillary distance (IPD) of the pair of binoculars 30. In one embodiment, in order to cause movement 14 of the right beam splitter 6, a translation mechanism 16 is coupled to a base 12 upon which the right beam splitter 6 is disposed. The translation mechanism 16 can be manually or automatically controlled to a position to provide an external light beam 8 configured to enter a light path of the pair of binoculars through an intended exit pupil. In one embodiment, the distance 24 is about 60-220 mm. It shall be noted that, in order to service a distance at mid to upper portion of this range, the collimator shown in FIG. 1 would have been required to be extended a distance of about several meters from the exit pupils, a distance impractical for most calibration applications. In one embodiment, the second or right beam splitter 6 can be replaced with a mirror which also reflects the transmitted light from the first beam splitter 6 to create the second light beam.

Figure 3:
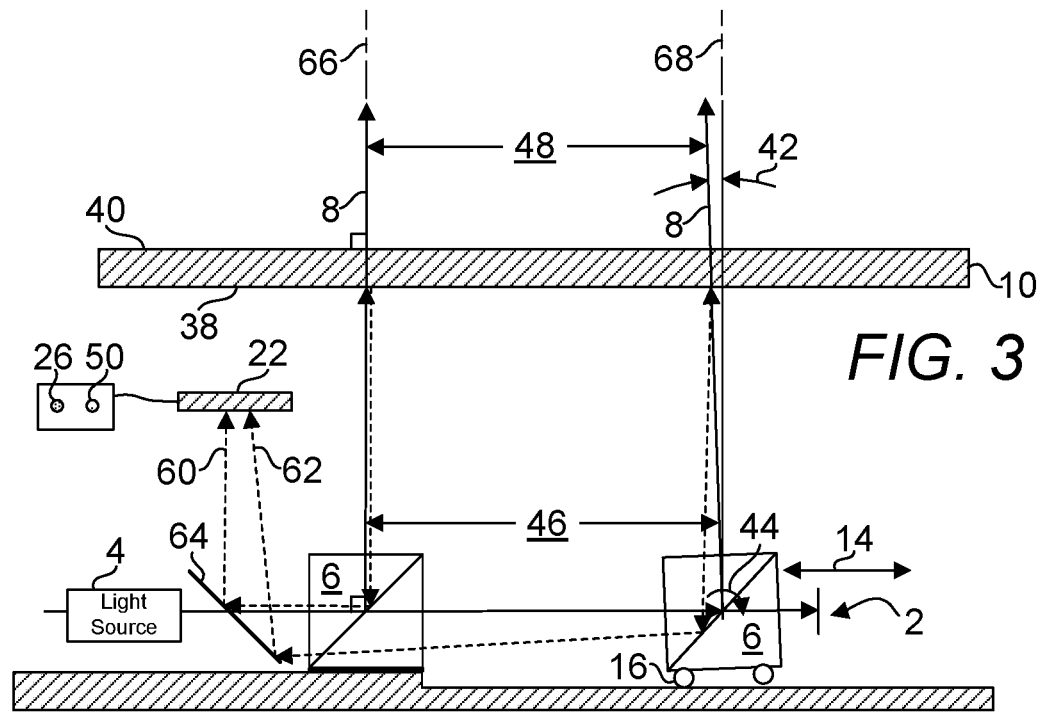
FIG. 3 is a diagram depicting one embodiment of a present system for providing highly-precise two spaced-apart light beams, wherein one of the light beams deviated from its parallel relationship with the datum.

FIG. 3 is a diagram depicting one embodiment of a present system 2 for providing highly-precise two spaced-apart light beams, wherein one of the light beams deviated from its parallel relationship with the datum, i.e., the left light beam 8. Note that distance 46 differs from distance 48 as the two light beams are not parallel. Here, the right beam splitter 6 is shown to have deviated from its factory mounting arrangement due, e.g., to shocks experienced by the system during transportation, etc. It shall be noted that a deviation 32 or $\Delta\Theta$ of, e.g., about several arc seconds with respect to the second central axis 68 has developed in the second beam splitter 6 and the light beam 18 reflected by the second beam splitter 6 is no longer parallel to the light beam reflected by the first beam splitter 6. The resulting image as seen at camera 22 is made up of two separate cast images 26, 50 as shown in FIG. 3. The manner in which cast images 26, 50 are distributed upon reflection from mirror 64 represents the parallelity of the two light beams 8. Referring back to FIG. 2, it shall be noted that the two light beams 8 are coincidental and the cast images 26, 50 overlap one another. Coincidental cast images 26, 50 appear on camera 22 as light beams that overlap one another and represent left and right light beams 8 which are parallel. In FIG. 3, the two light beams appear separately as two different spots 26, 50. As the first and second control light beams 60, 62 are each the result of multiple reflections, the footprint of the deviation at the second beam splitter 6 is magnified at the camera 22 by a factor $2^3$ or 8 as each of the deviated right and the left light beams 8 is reflected a total of 3 times. Therefore, the deviation seen at camera 22 is $2^3$ or 8 times $\Delta\Theta$ and a correction made in the orientation and/or position of the right beam splitter 6 and observed at camera 22 constitutes a precise correction due to the high signal-to-noise ratio (SNR) of the discrepancy shown between the first and second control light beams 60, 62. A request for correcting at least one of a rotation and a translation of the second beam splitter 6 is indicated in the setup in FIG. 3 as the second light beam 8 is determined to have deviated from its parallelity with the first light beam 8.

Figure 4:
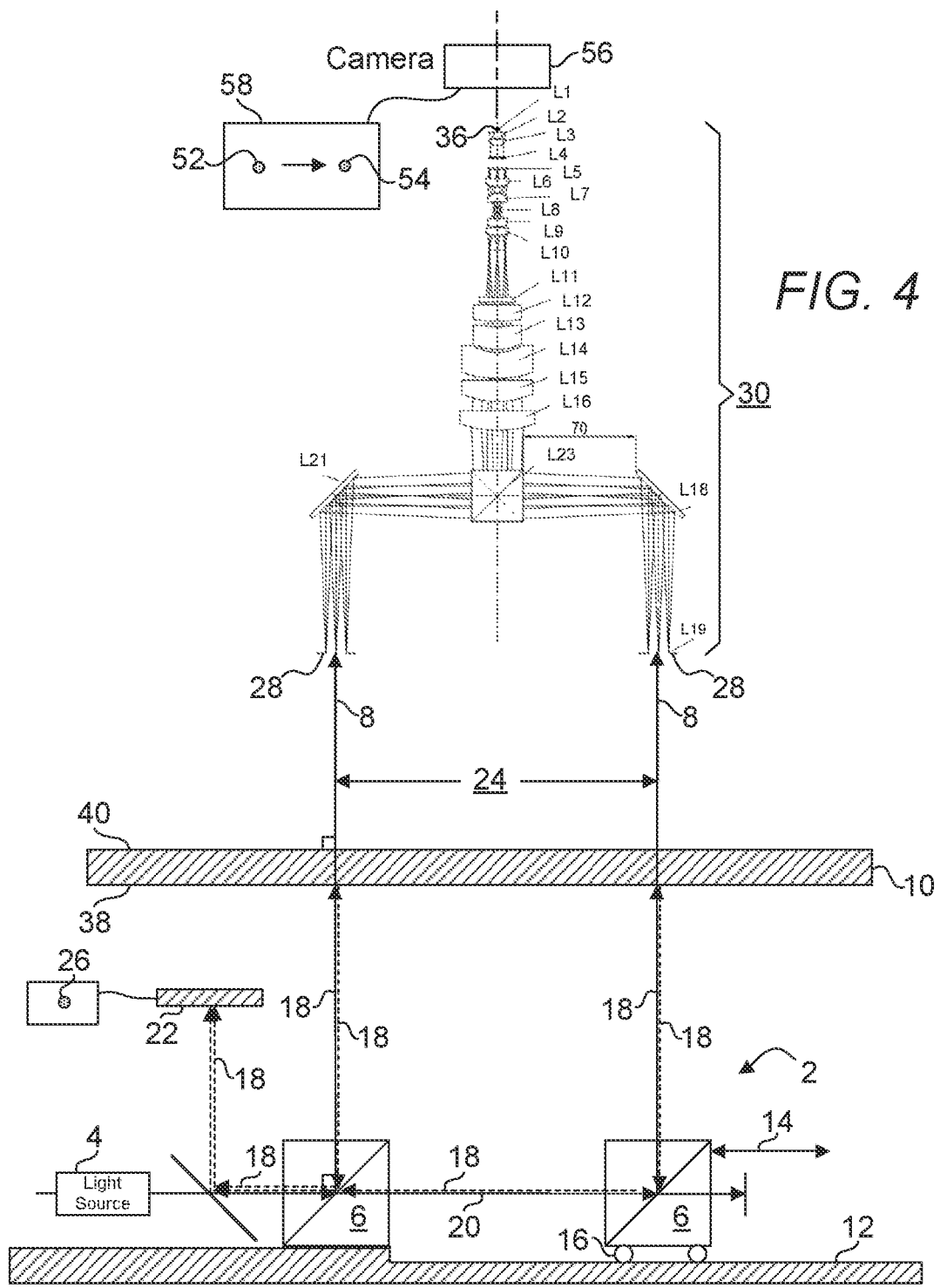
FIG. 4 is a diagram depicting one embodiment of a present system for providing highly-precise two spaced-apart parallel light beams used in calibrating the light paths of a pair of binoculars.
Figure 5:
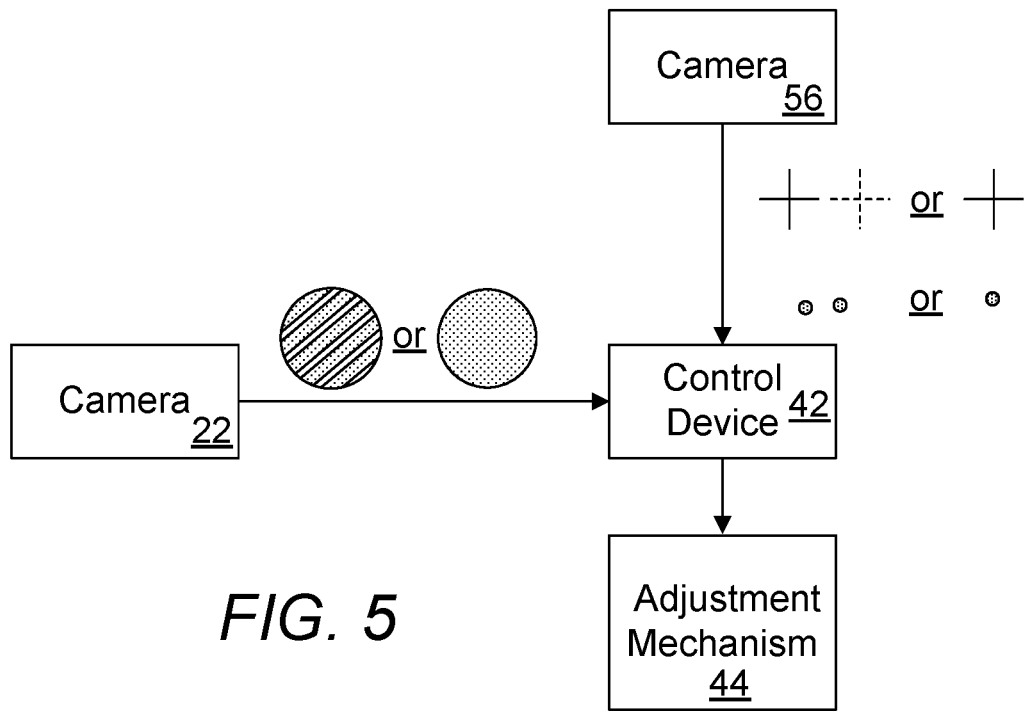
FIG. 5 is a diagram depicting a present control device configured to receive inputs from cameras and output control signals to an adjustment mechanism based on the inputs is from one or more cameras.

FIG. 4 is a diagram depicting one embodiment of a present system for providing highly-precise two spaced-apart parallel light beams 8 used in calibrating the light paths of a pair of binoculars 30. FIG. 5 is a diagram depicting a present control device 42 configured to receive and process inputs from cameras 22, 56 and output control signals to an adjustment mechanism 44 based on the inputs from one or more cameras. The light beams 8 of the system shall be made parallel first before calibration of the binoculars 30 can be attempted as these parallel light beams are used as a datum to which the light paths of the binoculars 30 are calibrated. In one embodiment, the parallelity of the two light beams 8 is continuously self-monitored such that a deviation from parallelity that develops during use, is automatically detected and communicated to a stakeholder of the system by the control device 42. Self-monitoring can be carried out, on a pre-determined schedule, by performing image analyses and/or feature extractions on the images received by camera 22 to ascertain whether a deviation has occurred by detecting the presence of two separate light spots 26, 50 due to deviation of the parallelity of the light beams. If a manual correction of the deviation is desired, the detection of a deviation can simply be communicated to the stakeholder. If an automatic correction of the deviation is desired, the detection of the deviation can result in the deviation being reported to the stakeholder and the deviation being corrected automatically before the stakeholder is informed of the completion of the deviation correction. In other words, the system can be actively self-monitored without ad-hoc or manual triggers to initiate a self-monitoring activity.

Upon ensuring that the system can produce two parallel light beams 8, the light paths of the binoculars 30 can then be calibrated. In use, a pair of binoculars allows light to enter at the entrance pupil 36 end before splitting the image received at the entrance pupil end into two light paths exiting the exit pupils 28. By the same token, in calibrating the light paths of the pair of binoculars, the two parallelly disposed light beams supplied at the exit pupils shall result in a unified image that is an aggregate of the two parallelly disposed light beams. Therefore, in calibrating the binoculars, the light paths of the binoculars are adjusted such that a resulting image at the entrance pupil end is a unified image of the two parallelly-disposed light beams. The present system includes a second camera 56 configured for receiving a second image resulting from directing the first light beam 8 and the second light beam 8 through exit pupils 46 of a pair of binoculars 30 to an entrance pupil 36 of the pair of binoculars 30 and a control device 42 to which the second camera 56 is functionally connected and if the second image is determined to be of non-coincidental cast images 52, 54 through the exit pupils 46 of the pair of binoculars 30 by the first light beam 8 and the second light beam 8, a light path through a first of the exit pupils 28 of the pair of binoculars 30 is determined to be not parallel to a light path through a second of the exit pupils 28 of the pair of binoculars 30.

Figure 6:
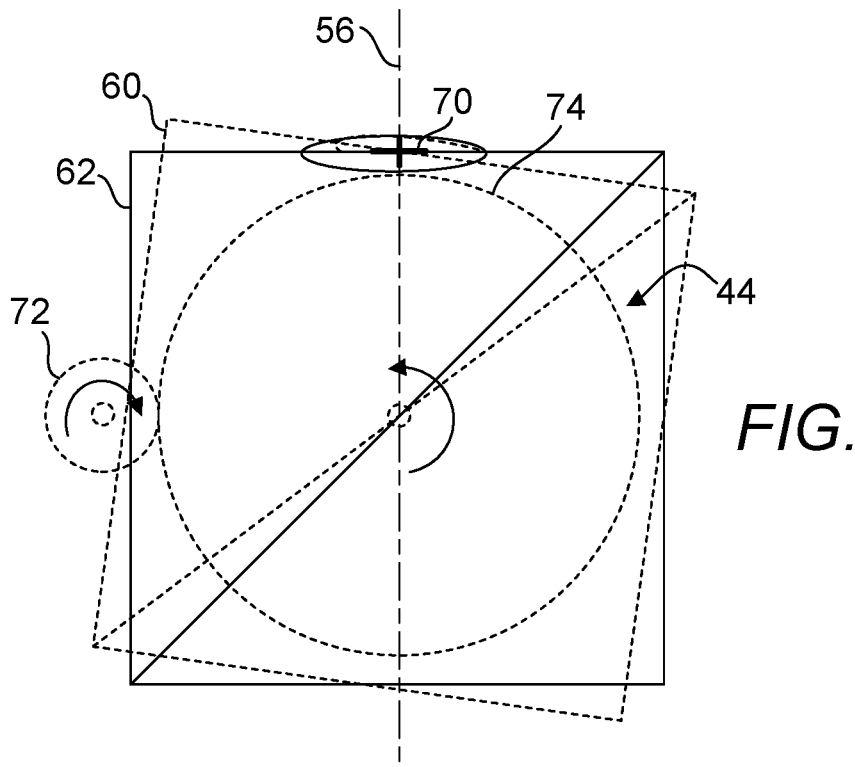
FIG. 6 is a diagram depicting a manner in which the orientation of a beam splitter is corrected.

FIG. 6 is a diagram depicting a manner in which the orientation of a beam splitter is corrected. Although a rotation mechanism 50 using a plurality of gears 72, 74 is shown, other types of positional or orientational/rotational correction mechanisms may be used. Shown herein is a beam splitter 6 disposed in an orientation 60 prior to its orientation correction due to a deviation in the orientation of the beam splitter 6. Upon correction, the beam splitter is shown disposed in orientation 62. Here, a drive gear 72 is used to correct the orientation of the beam splitter by driving the driven gear 74 attached to the beam splitter 6 such that a rotation of the drive gear 72 results in a rotation of the beam splitter 6 and the driven gear 74 in unison. In one embodiment, the cast images 52, 54 are cast images of reticles to ensure that completion of a calibration process can be easily discerned. The pair of binoculars can be said to have been calibrated when the cast images 52, 54 overlap one another. Again, calibration of the light paths of the binoculars may be accomplished manually or automatically. In a manual process, the light paths of the binoculars are adjusted manually until the cast images 52, 54 of reticles are observed to overlap one another. In an automated process, the light paths of the binoculars may be adjusted using tools configured for such adjustments. A requirement for calibration of the light paths of the binoculars originates from the determination that the cast images 52, 54 of reticles do not overlap by way of feature detection in an image analysis. The light paths of the binoculars are adjusted and another determination of whether the cast images 52, 54 of reticles approach one another is made. If they do, continue the adjustments until the cast images 52, 54 of reticles overlap. If they depart from one another, reverse the adjustments until the cast images 52, 54 of reticles overlap. The two light beams 60, 62 can therefore be said to be non-coincidental and the orientation of the second beam splitter 6 therefore requires adjustments to result in the first and second light beams 8 that are parallel.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for providing two spaced-apart parallel light beams wherein the space between the two spaced-apart parallel light beams is adjustable, said system comprising:
   (a) a first beam splitter configured for reflecting a light beam from a light source to create a first light beam;
   (b) a second light reflecting device configured for reflecting a transmitted light beam from the light beam from the light source to create a second light beam;
   (c) an optical flat comprising a first surface and a second surface facing away from said first surface, said optical flat disposed in a manner with said first surface facing said first light beam and said second light beam, said first surface configured to reflect and transmit said first light beam and said second light beam; and
   (d) a mirror,
   wherein said reflected first light beam is reflected by said first beam splitter and said mirror to form a first control light beam and said reflected second light beam is reflected by said second beam splitter and said mirror to form a second control light beam, if said first control light beam and said second control light beam are determined to be coincidental, as defined by said first control light beam and said second control light beam overlapping one another, said first light beam is determined to be parallel to said second light beam, otherwise a request for correcting at least one of a rotation by way of a rotation mechanism configured to cause said rotation of said second beam splitter and a translation by way of a translation mechanism configured to cause said translation of said second beam splitter is indicated.

2. The system of claim 1, further comprising a first camera configured for receiving a first image resulting from said first control light beam and said second control light beam and a control device to which said first camera is functionally connected and if said first image is determined by said control device to be of non-coincidental cast images by said first control light beam and said second control light beam, a request for correcting at least one of a rotation and a translation of said second beam splitter is indicated.

3. The system of claim 1, wherein said distance is about 60-220 mm.

4. The system of claim 1, further comprising a second camera configured for receiving a second image resulting from directing said first light beam and said second light beam through exit pupils of a pair of binoculars to an entrance pupil of the pair of binoculars and a control device to which said second camera is functionally connected and if said second image is determined to be of non-coincidental cast images through the exit pupils of the pair of binoculars by said first light beam and said second light beam, a light path through a first of the exit pupils of the pair of binoculars is determined to be not parallel to a light path through a second of the exit pupils of the pair of binoculars.

5. The system of claim 4, wherein said cast images are cast images of reticles.

6. The system of claim 1, wherein said first surface is a surface coated with a transmission-to-reflection ratio coating of about 50:50.

7. The system of claim 1, wherein said second surface is a surface coated with an anti-reflective (AR) coating.

\* \* \* \* \*